March 24, 1959     H. B. VINCENT     2,878,623
METHOD OF ATTACHING METAL BRACKETS TO GLASS
Filed Sept. 14, 1956
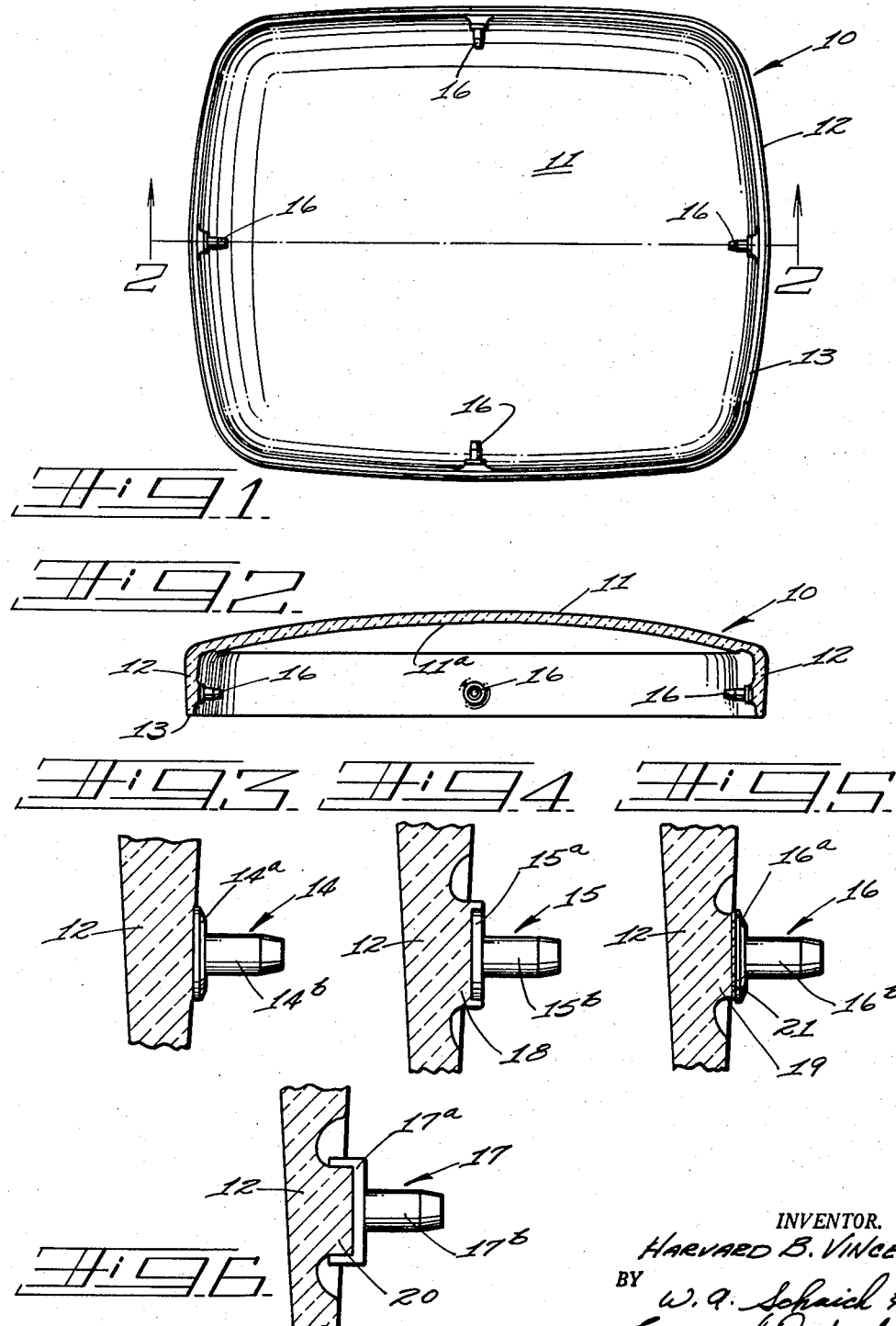
INVENTOR.
HARVARD B. VINCENT
BY
W. A. Schaich
Leonard D. Soubill
ATTORNEYS

United States Patent Office 2,878,623
Patented Mar. 24, 1959

2,878,623

METHOD OF ATTACHING METAL BRACKETS TO GLASS

Harvard B. Vincent, Toledo, Ohio, assignor to Owens-Illinois Glass Company, a corporation of Ohio Application September 14, 1956, Serial No. 609,950

4 Claims. (Cl. 49—81)

This invention relates to an improved method of uniting prefabricated metal support brackets to preformed rigid glass parts wherein a portion of the glass is shaped to provide sealing or mounting areas. The present invention is particularly applicable to hollow glass face plates utilized to form cathode-ray tube envelopes employed in the manufacture of color TV picture tubes.

Metals and alloys are customarily sealed to glass by melting all or part of the glass in the sealing area and contacting it with the metal. Such seals may be classified as those in which the thermal expansion and contraction coefficients of the glass and metal are essentially matched and those in which the thermal coefficients are unmatched. Heretofore the majority of glass-to-metal seals have consisted of the former type in which primarily the contraction coefficient of the glass between its normal setting point and atmospheric temperatures is sufficiently in agreement with that of the metal through the same temperature range that differences in contraction between glass and metal on cooling do not cause breaking stresses in the glass. With contraction coefficients properly matched the thickness of the metal at the seal is relatively unimportant.

However, when contraction coefficients of the glass and metal are unmatched and appreciably dissimilar, the thickness of the metal at the seal is of utmost importance. Heretofore in successful sealing with unmatched thermal contraction coefficients the metal member has been required to be extremely thin or thinly tapered at the seal area. This condition has placed a burdensome and limiting requirement on direct glass-to-metal sealing. The difficulties of sealing unmatched glass and metal members by direct fusion have been eliminated by the subject invention where it is desired to seal a metal support member to a glass surface.

Accordingly, it is an object of this invention to provide a simple method of joining a metal support member to a glass surface by properly shaping the latter to form a sealing area to thereby make less critical the stress pattern ordinarily developed by direct glass-to-metal fusion.

Another object of this invention is to provide a method of uniting a rigid prefabricated metal bracket to a glass article by utilization of a mounting pedestal of glass to permit joining glass-to-metal having dissimilar thermal characteristics.

A further object of this invention is to provide a method of mounting a plurality of metal brackets on an annular flange of a preformed hollow glass face plate for a cathode-ray tube envelope without unduly stressing the supporting areas of the glass.

A still further object of this invention is to provide a glass face plate having a series of metal brackets adequately sealed thereto by direct fusion, each bracket mounted upon a cylindrical pedestal of glass integrally formed with the glass surface to constitute an essentially stress-free mounting capable of supporting loads.

The specific nature of this invention, as well as other objects and advantages thereof, will become apparent to those skilled in the art from the following detailed description, taken in conjunction with the annexed sheet of drawings on which, by way of preferred example only, are illustrated the preferred embodiments of this invention.

On the accompanying drawings:

Fig. 1 is a plan view of the open end of a glass face plate for a cathode-ray tube envelope in accordance with the invention.

Fig. 2 is a vertical sectional view taken along the line 2—2 of Fig. 1.

Fig. 3 is an enlarged vertical sectional view of an edge portion of the face plate illustrated a mounting bracket attached according to conventional practice.

Figs. 4, 5 and 6 are views similar to Fig. 3 illustrating three modifications of support brackets mounted in accordance with the present invention.

Although this invention will be described as specifically applied to the manufacture of a cathode-ray tube and its glass viewing portion in particular, it will be apparent to those skilled in the art that the principles of the invention are equally applicable to the manufacture of any type or structure of preformed rigid glass article upon which it is desired to mount a metallic element either by direct fusion of glass-to-metal or by the utilization of a sealing glass.

A preferred embodiment of this invention consists of a glass face place 10 having a uniformly curved viewing panel 11 and an annular flange portion 12 which terminates at an annular sealing surface 13. Face plate 10 may be circular or rectangular in shape, being shown as the latter on Fig. 1, as conventionally employed in so-called black and white television picture tubes. The interior surface of viewing panel 11 has deposited thereon a layer 11a of phosphor material which constitutes the target or image-producing area of a cathode-ray picture tube. Of course, the particular phosphor materials employed may be varied widely as known in the art and do not constitute a part of this invention.

In many types of color cathode-ray picture tubes it is necessary to mount an electronic structure such as a shadow mask or line grid (not shown) in extremely precise alignment with layer 11a as well as with one or more beam guns in the tube funnel. To secure this alignment a series of metal support brackets 16 are attached to flange portion 12 to firmly retain and position the electronic structure. Brackets 16 may be located on the four internal sidewalls of flange portion 12 in a single plane directed inwardly in accurate alignment with phosphor layer 11a. Brackets 16 are normally arranged perpendicular to the central axis of face plate 10 which is coincident with the tube axis.

If a metal bracket 14 composed of base 14a and stud 14b (Fig. 3) is attached to the glass flange by direct glass-to-metal fusion so that the interface between glass and metal lies within or contiguous with the glass body, the stress conditions developed may be quite critical. When the metal has a slightly greater thermal contraction than the glass, the portion of the glass under base 14a is placed in compression and the region immediately surrounding the base is placed in radial tension. When the metal has a slightly lesser thermal contraction than the glass, the glass portion under base 14a is in radial tension and the surrounding region is in circumferential tension. The presence of tension stresses in the glass of flange portion 12 creates a fragile attachment of bracket 14 and a glass condition which is readily subject to breakage in tube processing. Furthermore, bracket 14 does not possess sufficient durability and strength to permanently support the electronic structure in required alignment.

As shown on Fig. 4, bracket 15 comprised of circular base 15a and stud 15b is attached to a cylindrical section 18 of glass which is integrally formed from glass flange portion 12. Cylindrical section 18 may be formed in the part originally by molding or subsequently as desired by locally heating and reshaping the glass in the sealing area. With bracket base 15a attached to cylindrical elevated section 18 of glass by thermal fusion whereby base 15a is embedded within the glass, a greater degree of tolerance for mismatch in thermal properties between glass and metal is permitted. The end of glass section 18 to which the metal is attached may be in compression of reasonable magnitude. The end of the glass cylinder integrally formed with the body of the glass part will show reduced stress depending upon the length of the cylindrical section 18. By suitable choice of cylinder length the stress transferred into the glass part may be reduced to acceptable values. The external surface of base 15a (Fig. 4) is made approximately flush with the end of cylinder section 18 so that the installation is smooth to avoid any tendency to trap liquids between glass and metal in tube processing. In view of the thinness of the glass surrounding base 15a stresses are reduced to within acceptable values.

As shown on Fig. 5 bracket 16 comprised of circular base 16a and stud 16b is attached to cylindrical glass section 19 which is of approximately the same diameter as base 16a. Base 16a may also be permitted to overhang glass section 19 so that the area of the glass under bracket 16 is placed in slight compression. Base 16a may be directly fused to the glass by locally heating shaped section 19 or by utilizing a relatively low-melting glass sealing composition 21. Obviously bases 15a and 16a as well as glass sections 18 and 19 may be formed circular, elliptical or in any other preferred shape to produce minimum stress values.

As shown on Figure 6 bracket 17 consists of base 17a and stud 17b which base is cup-shaped to surround cylindrical glass section 20. Bracket 17 may require a longer length of glass section 20 and is itself more expensive to manufacture. Bracket 17 may also be attached either by direct fusion or by a sealing glass 21.

Various modifications may be resorted to within the spirit and scope of the appended claims.

I claim:

1. The method of mounting a metal support bracket on a surface of a preformed hollow glass article comprising the steps of reshaping a regular glass surface to integrally form a projecting essentially cylindrical pedestal extending and constituted therefrom and fusing a circular base of a metal bracket having generally the same diameter to the exposed end surface of said cylindrical pedestal, said metal bracket composed of metal alloy compatible in thermal contraction with the glass.

2. The method in accordance with claim 1, including partially embedding said base within the exposed end portion of said cylindrical pedestal with the outer surface of said base essentially flush therewith.

3. The method of mounting a plurality of individual metal support members interiorly within the flange portion of a glass face plate of a cathode-ray tube, which method comprises the steps of heating and reshaping a plurality of localized areas of said glass face plate to form an integral series of cylindrical pedestals extending inwardly, constituted from said localized areas, and thermally fusing circular bases of said metal support members to the exposed ends of each of said cylindrical pedestals, said metal members composed of metal alloy compatible in thermal expansion and contraction properties with the glass.

4. The method of mounting a plurality of individual metal support members interiorly within the flange portion of a hollow glass face plate of a cathode-ray tube, which method comprises the steps of heating and simultaneously reshaping a plurality of localized sidewall areas of said flange portion of said glass face plate to form an integral series of cylindrical pedestals extending inwardly in the same horizontal plane and comprised of glass from said localized areas, and thermally fusing circular bases of said metal support members to the exposed ends of each of said cylindrical pedestals, said metal members composed of metal alloy compatible in thermal expansion and contraction properties with the glass.

References Cited in the file of this patent

UNITED STATES PATENTS

| | | |
|---|---|---|
| 2,291,660 | Spencer | Aug. 4, 1942 |
| 2,321,224 | Madden | June 8, 1943 |
| 2,486,101 | Beggs | Oct. 25, 1949 |
| 2,511,164 | Koch | June 13, 1950 |
| 2,637,942 | Hinkley | May 12, 1953 |
| 2,689,924 | Honing et al. | Sept. 21, 1954 |
| 2,727,172 | Mark et al. | Dec. 13, 1955 |
| 2,755,405 | Wilhelm | July 17, 1956 |
| 2,766,394 | Darsie | Oct. 9, 1956 |
| 2,778,966 | Faustini et al. | Jan. 22, 1957 |
| 2,784,532 | Griffiths | Mar. 12, 1957 |
| 2,795,719 | Morrell | June 11, 1957 |